Dec. 11, 1928. 1,694,764

R. BERINGER

COWL VENTILATOR

Filed Jan. 23, 1925

INVENTOR
ROSCOE BERINGER
BY
ATTORNEYS.

Patented Dec. 11, 1928.

1,694,764

UNITED STATES PATENT OFFICE.

ROSCOE BERINGER, OF DETROIT, MICHIGAN, ASSIGNOR TO GENERAL MOTORS CORPORATION, OF DETROIT, MICHIGAN, A CORPORATION OF DELAWARE.

COWL VENTILATOR.

Application filed January 23, 1925. Serial No. 4,263.

This invention relates to ventilators and is herein shown as embodied in an improved construction for the cowl closures of motor vehicles.

An object of the invention is to provide an improved cowl door which will make a tight closure with the rim of the cowl opening. Another object is to provide a light and strong sheet metal door for a cowl.

To these ends and also to improve generally upon devices of the character indicated my invention consists in the various matters hereinafter described and claimed.

Figure 1:
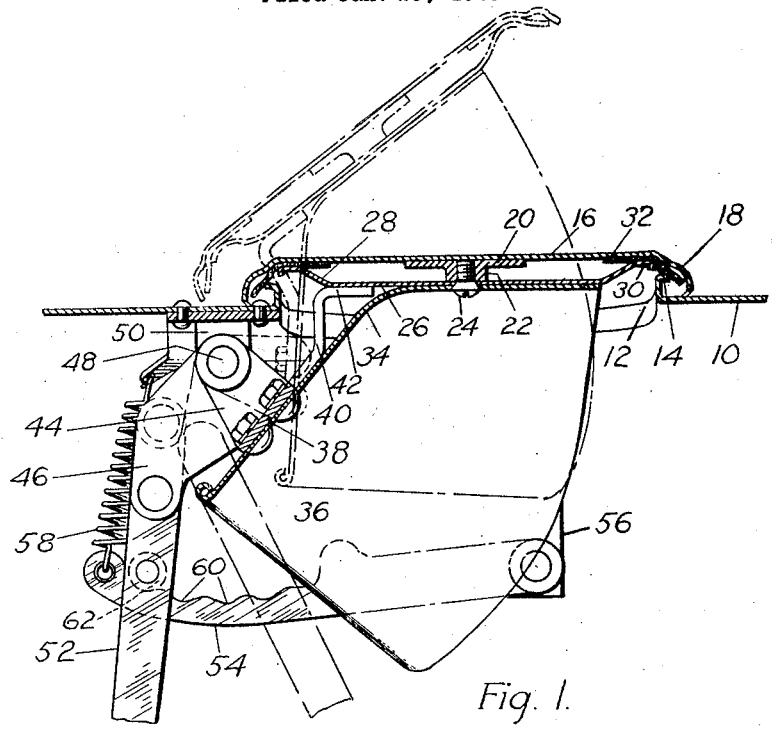
Figure 2:
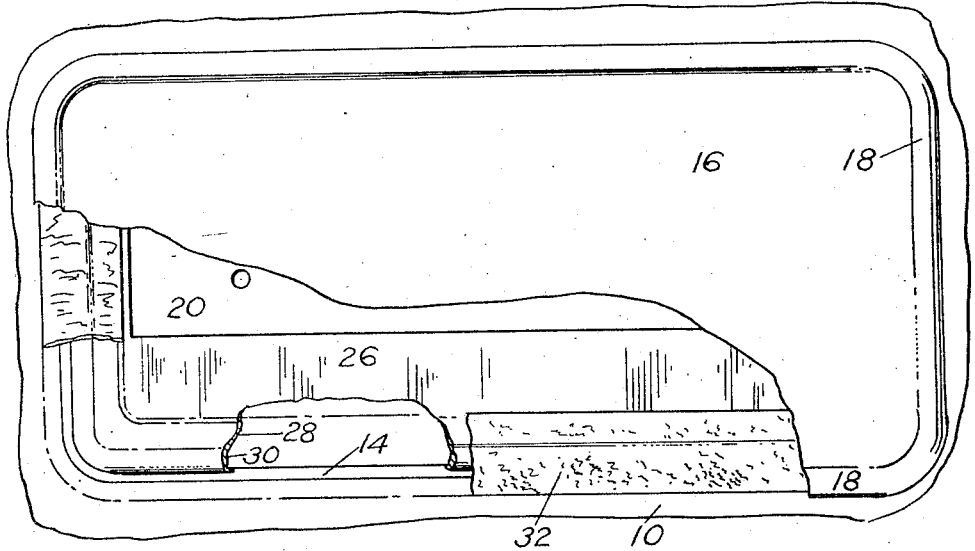

In the drawings, Figure 1 is a vertical central section and Figure 2 is a plan view with parts broken away to show interior construction.

The numeral 10 indicates the top of a cowl having a substantially rectangular opening the rim of which is provided with an outwardly extending reinforcement in the form of a web 12 terminating in an outwardly bent flange 14. The cowl door comprises an outer plate 16 the rim of which is formed with a curved bead 18 adapted to enclose the flange 14. Fixed to the under side of plate 16 is a spacing bar 20 with a central enlargement 22 tapped to receive screw bolts 24 which hold the inner plate 26 of the door. The plate 26 has an upwardly inclined portion 28 terminating in a lateral extension 30 which clamps a strip of felt 32, or some similar fibrous or soft flexible material, to the rim of the door. The strip may be a continuous ribbon of the contour of the cowl opening and is designed to extend over the flange 14 and make a tight closure when the door is closed. It also cushions the contact of the outer and inner door plates 16 and 26.

The door is rigidly connected to a curved plate 34 clamped to the plate 26 by the screws 24 and having a pair of opposite side wings 36. Plate 34 is fastened to a bar 38 having bracing arms 40 extending upwardly and terminating in extensions 42 fastened to the plate 26. The bar 38 has extensions 44 and 46 at its ends rockable on a shaft 48 mounted in ears 50 depending from a cleat fastened to the inside of the cowl. The extension 46, which is at one side of the cowl, is rigidly secured to an arm 52 extending downwardly and connected to any suitable operating devices within reach of the driver of the vehicle. Swinging the arm 52 opens the ventilating door as indicated by the broken lines in Figure 1.

Means is provided for locking the door in various positions. A locking arm 54 is pivoted at its front end to a bracket 56 and its rear end is urged upwardly by a coil spring 58. The locking arm, which has a series of locking depressions 60, is pulled upwardly by the spring against a lateral projection or roller 62 on the arm 52, thereby holding the door yieldingly open at any desired angle.

Although the invention has been described by reference to a specific construction, it should be understood that, in its broader aspects, it is not necessarily limited to the specific form selected for mere illustrative purposes.

I claim:

1. In a device of the character described, a cowl having an opening, a web at the rim of the opening terminating in an outwardly extending flange, an outer door plate having its rim formed with a curved bead to enclose said flange, a spacing bar fixed to said outer door plate, an inner door plate secured to said bar and having its rim inclined upwardly and terminating adjacent to said bead, and a strip of fibrous material clamped between said inner and outer plates and extending outwardly over said flange.

2. In a device of the character described, the combination with a cowl having an opening, an upstanding portion about the margin of the opening, and an outturned peripheral flange on said upstanding portion, of a cover for the opening including a plate having a down-turned peripheral portion overlying said peripheral flange, and a second plate secured to said first plate in spaced relation therewith, and having an upturned peripheral portion and a sealing gasket held between said first plate and the peripheral portion of the second plate and having a downturned portion located within said downturned peripheral portion of the first plate, which is adapted to contact the edge of said peripheral flange.

3. A cover for a cowl port that has an upstanding marginal flange, including a plate formed with a downturned peripheral portion overhanging the marginal flange at the port, a second plate associated therewith and being formed with an upturned peripheral portion located within said downturned peripheral portion, and a gasket clamped between said first plate and the peripheral portion of the second plate, and having a loosely hanging flap portion within said downturned peripheral portion for engagement with the upstanding marginal flange of the cowl port.

4. A cover for a cowl port including a plate formed with a downturned peripheral portion, a second plate associated therewith in spaced relation and being formed with an upturned peripheral portion located within said downturned peripheral portion, a gasket having a portion located between the first plate and the peripheral portion of the second plate, and having a portion extending downwardly within the underside of said downturned peripheral portion, and means to removably secure said plates together in spaced relation and firmly hold said gasket in place.

5. A cover for a cowl port including a pair of spaced plates, one of the plates having a downturned peripheral portion and the other plate having an upturned peripheral portion located within said downturned portion, and a gasket having a portion clamped between the first mentioned plate and the peripheral portion of the second plate, and having a downward extending portion located within said downturned peripheral portion and constituting a flexible sealing flap.

In testimony whereof I affix my signature.

ROSCOE BERINGER.